US010934639B2

(12) United States Patent
Horter et al.

(10) Patent No.: US 10,934,639 B2
(45) Date of Patent: Mar. 2, 2021

(54) SENSORY FABRIC HAVING A PLURALITY OF FABRIC LAYERS AND METHOD FOR THE PRODUCTION THEREOF

(71) Applicant: PILZ GMBH & CO. KG, Ostfildern (DE)

(72) Inventors: Hansjürgen Horter, Oberboihingen (DE); Karl Gönner, Riedlingen (DE); Paul Hofmann, Illertissen (DE); Metin Caliskan, Reutlingen (DE); Onedin Ibrocevic, Ostfildern (DE); Matthias Kuczera, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 164 days.

(21) Appl. No.: 16/143,599

(22) Filed: Sep. 27, 2018

(65) Prior Publication Data

US 2019/0024269 A1   Jan. 24, 2019

Related U.S. Application Data

(63) Continuation of application No. PCT/EP2017/057848, filed on Apr. 3, 2017.

(30) Foreign Application Priority Data

Apr. 4, 2016 (DE) .................... 10 2016 106 071.2

(51) Int. Cl.
*D01D 1/00* (2006.01)
*D03D 1/00* (2006.01)
(Continued)

(52) U.S. Cl.
CPC .......... *D03D 1/0088* (2013.01); *D03D 11/00* (2013.01); *G01L 1/146* (2013.01); *G01L 1/18* (2013.01);
(Continued)

(58) Field of Classification Search
CPC .. D03D 1/0088; D03D 11/00; D03D 2401/06; D03D 2401/16; G01L 1/146; G01L 1/18; G01L 1/205; G01L 5/228
See application file for complete search history.

(56) References Cited

U.S. PATENT DOCUMENTS 4,659,873 A  *  4/1987  Gibson .................. H01H 3/141
                                                 178/18.05
4,715,235 A  *  12/1987  Fukui ...................... D04B 1/14
                                                 73/862.68

(Continued)

FOREIGN PATENT DOCUMENTS

CN       1430765 A      7/2003
CN       1580389 A      2/2005
(Continued)

OTHER PUBLICATIONS

English language translation of Chinese Examination Report for Application No. 201780027003.6; dated Oct. 31, 2019; 10 pp.

(Continued)

*Primary Examiner* — David J Bolduc
(74) *Attorney, Agent, or Firm* — Harness, Dickey & Pierce, P.L.C.

(57) ABSTRACT

A woven fabric having at least three layers disposed on top of one another. One layer forms a lowermost woven fabric layer and another layer forms an uppermost woven fabric layer. A first and a second woven layer have electrically conductive warp threads and/or electrically conductive weft threads. An intermediate layer is disposed between the first woven fabric layer and the second woven fabric layer. The first woven fabric layer, the second woven fabric layer, and the intermediate layer form a sensor arrangement which has an electrical property that varies while a force acts on the layers. Each of the uppermost and lowermost woven fabric (Continued)

layer in terms of weaving technology is connected to one of the other woven fabric layers present.

17 Claims, 8 Drawing Sheets

(51) Int. Cl.
    *D03D 11/00*     (2006.01)
    *G01L 5/22*     (2006.01)
    *G01L 1/14*     (2006.01)
    *G01L 1/18*     (2006.01)
    *G01L 1/20*     (2006.01)

(52) U.S. Cl.
    CPC .............. *G01L 1/205* (2013.01); *G01L 5/228* (2013.01); *D10B 2401/06* (2013.01); *D10B 2401/16* (2013.01)

(56) References Cited

U.S. PATENT DOCUMENTS

| | | | | |
|---|---|---|---|---|
| 4,795,998 A * | 1/1989 | Dunbar | ................ | H01H 13/785 338/5 |
| 4,837,548 A * | 6/1989 | Lodini | ................... | H01C 10/12 338/47 |
| 4,878,148 A * | 10/1989 | Hee | ......................... | A61N 1/14 361/220 |
| 6,271,621 B1 * | 8/2001 | Ito | ............................. | G01L 1/16 310/358 |
| 6,333,736 B1 * | 12/2001 | Sandbach | ............. | G06F 3/0414 178/18.03 |
| 6,452,479 B1 * | 9/2002 | Sandbach | ............. | G06F 3/045 338/101 |
| 6,861,961 B2 * | 3/2005 | Sandbach | ............. | G06F 3/023 178/18.05 |
| 7,145,432 B2 * | 12/2006 | Lussey | ................... | H01H 3/141 338/47 |
| 7,365,031 B2 * | 4/2008 | Swallow | .................. | D02G 3/38 174/124 R |
| 9,488,610 B2 | 11/2016 | Heppe | | |
| 10,228,806 B2 * | 3/2019 | Tomita | .................... | G01L 1/205 |
| 10,519,575 B2 * | 12/2019 | Thompson | ............. | D03D 13/00 |
| 10,591,273 B2 * | 3/2020 | Veca | ..................... | B60N 2/797 |
| 10,638,618 B1 * | 4/2020 | Teil | ..................... | H05K 5/0017 |
| 2002/0134116 A1 * | 9/2002 | Sandbach | ............. | H01H 13/785 66/202 |
| 2003/0010393 A1 * | 1/2003 | Kuji | ..................... | D21F 1/0045 139/383 A |
| 2003/0119391 A1 | 6/2003 | Swallow et al. | | |
| 2003/0186608 A1 * | 10/2003 | Goldberg | ................ | A61N 1/14 442/304 |
| 2003/0211797 A1 * | 11/2003 | Hill | ....................... | H05K 1/189 442/205 |
| 2004/0113637 A1 * | 6/2004 | Thinnes | ................. | G01R 31/54 324/713 |
| 2005/0069695 A1 * | 3/2005 | Jung | ...................... | D03D 15/02 428/328 |
| 2005/0109587 A1 | 5/2005 | Best et al. | | |
| 2005/0146076 A1 * | 7/2005 | Alexander | ........... | D03D 1/0088 264/257 |
| 2006/0228970 A1 * | 10/2006 | Orr | ......................... | D04H 3/05 442/329 |
| 2006/0258247 A1 * | 11/2006 | Tao | ........................ | D03D 15/00 442/301 |
| 2007/0141939 A1 * | 6/2007 | Sandbach | .............. | H01H 3/141 442/304 |
| 2007/0202765 A1 | 8/2007 | Krans et al. | | |
| 2010/0013406 A1 * | 1/2010 | Bhattacharya | .......... | H05K 1/189 315/291 |
| 2010/0154918 A1 * | 6/2010 | Li | ............................ | D04B 1/14 139/412 |
| 2010/0208445 A1 * | 8/2010 | Asvadi | .................. | H05K 1/189 361/809 |
| 2013/0053754 A1 * | 2/2013 | Heppe | ................. | A61M 1/3659 604/6.16 |
| 2013/0075018 A1 * | 3/2013 | Heppe | ................. | A61M 1/3659 156/148 |
| 2013/0113057 A1 * | 5/2013 | Taylor | ..................... | G01N 3/08 257/417 |
| 2014/0150573 A1 | 6/2014 | Cannard et al. | | |
| 2015/0000425 A1 * | 1/2015 | Miura | ...................... | G01L 1/22 73/862.627 |
| 2015/0331522 A1 * | 11/2015 | McMillen | ............ | A61B 5/6843 345/174 |
| 2015/0331523 A1 * | 11/2015 | McMillen | ............ | G06F 3/0416 345/174 |
| 2017/0303392 A1 * | 10/2017 | Naigertsik | ............. | H05K 7/207 |
| 2018/0151795 A1 * | 5/2018 | Cobanoglu | ........... | H01L 41/087 |
| 2018/0171514 A1 * | 6/2018 | Cobanoglu | ............ | G01K 7/003 |
| 2018/0327939 A1 * | 11/2018 | Cobanoglu | ........ | D03D 15/0027 |
| 2019/0017885 A1 * | 1/2019 | Horter | ..................... | G01L 1/146 |
| 2019/0021407 A1 * | 1/2019 | Howland | .............. | G06F 1/1637 |
| 2020/0040492 A1 * | 2/2020 | Pilz | ........................ | G01V 3/088 |

FOREIGN PATENT DOCUMENTS

| | | |
|---|---|---|
| CN | 1938677 A | 3/2007 |
| DE | 60102003 T2 | 11/2004 |
| DE | 60026019 T2 | 8/2006 |
| DE | 102011111061 A1 | 2/2013 |
| DE | 102011113838 A1 | 3/2013 |
| EP | 1099191 B1 | 2/2006 |
| GB | 2516987 A | 2/2015 |
| JP | 201631269 A | 3/2016 |
| WO | WO-0175778 A1 | 10/2001 |
| WO | WO-2005121729 A1 | 12/2005 |

OTHER PUBLICATIONS

German language International Search Report for PCT/EP2017/057848; dated Jun. 14, 2017; 12 pp.

* cited by examiner

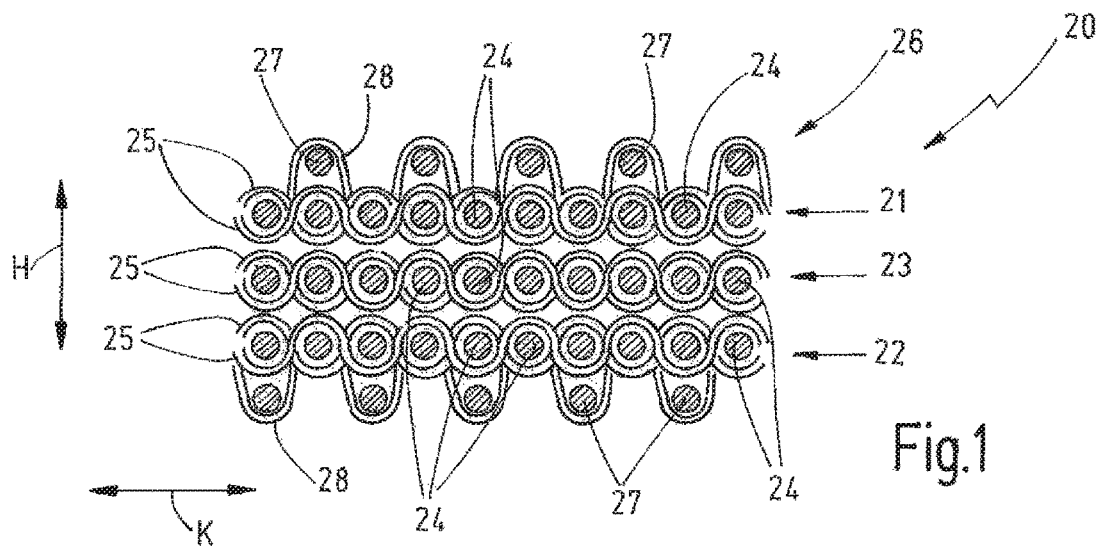
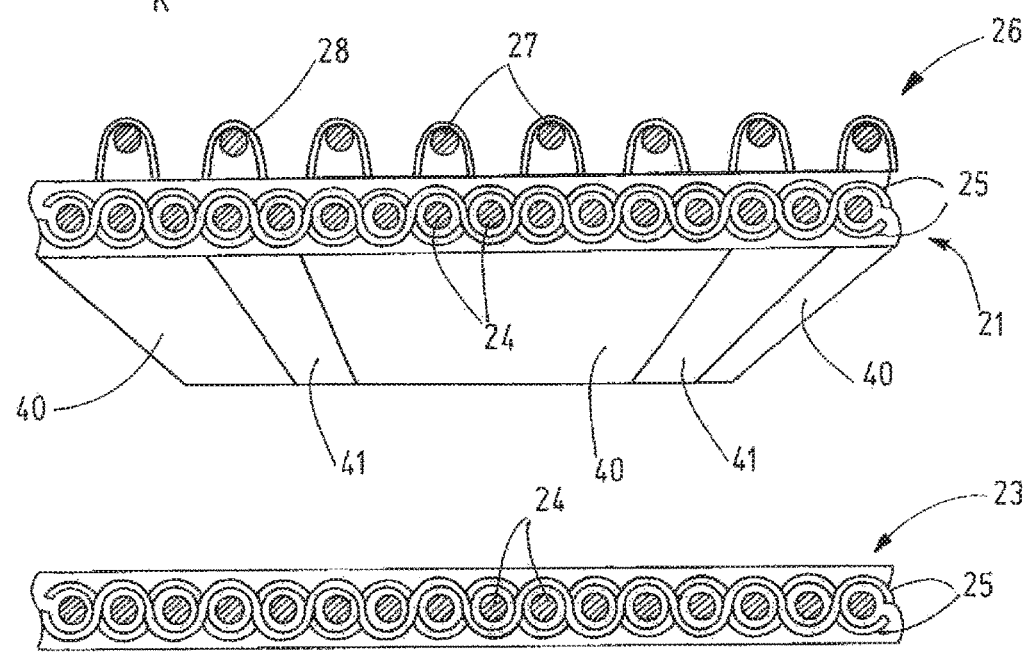
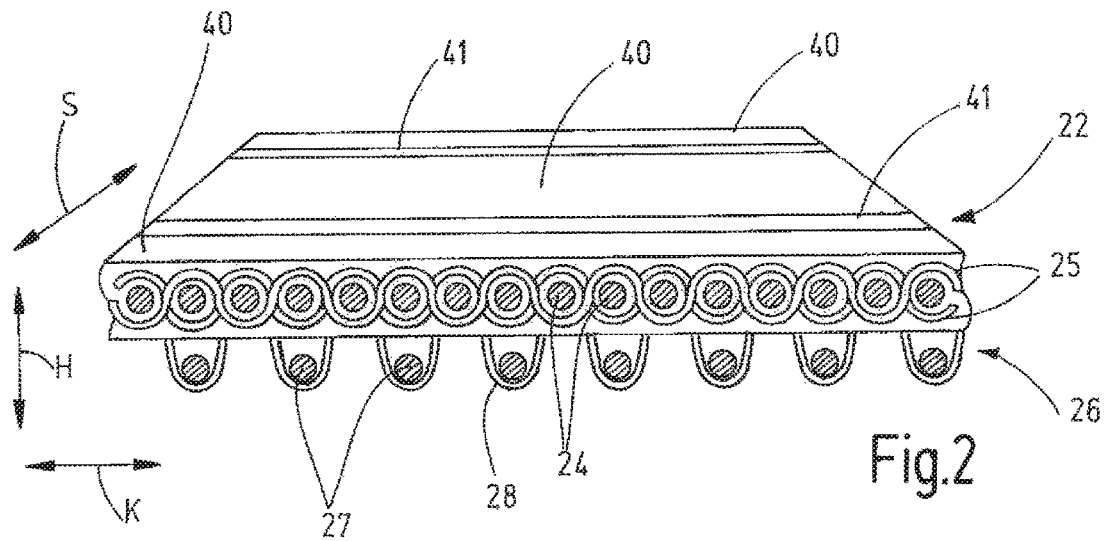
Fig.1
Fig.2

SENSORY FABRIC HAVING A PLURALITY OF FABRIC LAYERS AND METHOD FOR THE PRODUCTION THEREOF

CROSS-REFERENCES TO RELATED APPLICATIONS

This application is a continuation of international patent application PCT/EP2017/057848, filed on Apr. 3, 2017 designating the U.S., which international patent application has been published in German language and claims priority from German patent application DE 10 2016 106 071.2, filed on Apr. 4, 2016. The entire contents of these priority applications are incorporated herein by reference.

BACKGROUND OF THE INVENTION

The invention relates to a woven fabric having at least three layers disposed on top of one another, of which at least two are woven fabric layers, and to a method for producing such a woven fabric. The woven fabric is specified for detecting a force or a pressure acting thereon.

A sensory woven fabric having a woven fabric layer is known, for example from U.S. Pat. No. 4,795,998 A. Conductive threads of the woven fabric layer intersect at intersection points. Depending on a force acting thereon, the transition resistance between the threads bearing on one another varies. On account thereof, a force acting on one of the intersection points can be detected.

WO 2005/121729 A1 discloses a textile capacitive sensor having as the lowest layer a textile that is conductive over its entire surface and a non-electrically conductive uppermost layer. Planar electrodes are applied to this upper layer, said electrodes together with the lowest layer respectively forming a capacitor with variable capacitance. A non-electrically conductive elastic material is arranged between the uppermost layer and the lowest layer. If the spacing between the electrodes and the lowest conductive layer is changed by means of a force acting upon the textile, the capacitance changes, which may be ascertained by means of a corresponding circuit.

DE 60102003 T2 discloses a conductive pressure-sensitive material. In this case, conductive threads are arranged crossing in a layer, wherein without a force acting upon the threads an electrically conductive contact is not produced at the crossing points. Electrically non-conductive threads are incorporated for this purpose, said threads maintaining the spacing between the crossing electrically conductive threads in the starting state. An electrically conductive contact is only produced at a crossing site if a force or a pressure acts upon the material. A similar arrangement is also known from U.S. Pat. No. 4,659,873 A. There, electrically conductive woven fabric layers are mutually spaced apart by non-conductive spacing means such as an air gap, non-conductive threads, or dome-shaped spacers. An electrically conductive contact between the woven fabric layers is established in the event of a force acting thereon.

SUMMARY OF THE INVENTION

It is an object of the present invention to achieve an improved sensory textile material that is simple to produce.

According to an aspect of the invention there is provided a woven fabric having at least three layers disposed on top of one another, wherein two of the latter are woven fabric layers, of which one woven fabric layer forms a lowermost woven fabric layer and another woven fabric layer forms an uppermost woven fabric layer, wherein one of the woven fabric layers forms a first woven layer which has electrically conductive warp threads and/or electrically conductive weft threads; wherein a further of the woven fabric layers forms a second woven fabric layer which has electrically conductive warp threads and/or electrically conductive weft threads; wherein one of the layers forms an intermediate layer which is disposed between the first woven fabric layer and the second woven fabric layer; wherein the first woven fabric layer, the second woven fabric layer, and the intermediate layer form a sensor arrangement which has an electrical property that varies while a force acts on the layers; wherein the uppermost woven fabric layer in terms of weaving technology is connected to one of the other woven fabric layers present; and wherein the lowermost woven fabric layer in terms of weaving technology is connected to one of the other woven fabric layers present.

According to a further aspect of the invention there is provided a method for producing the above mentioned woven fabric, wherein the first woven fabric layer and the second woven fabric layer are produced on a common weaving machine, and the three layers herein moreover in terms of weaving technology are interconnected indirectly by means of an additional binding system and/or are directly interconnected.

The woven fabric according to the present disclosure may have a plurality of woven fabric layers and at least three layers disposed on top of one another, of which at least two are woven fabric layers. One of said woven fabric layers forms a first woven fabric layer, a further of said woven fabric layers forms a second woven fabric layer, and yet a further of said layers forms an intermediate layer which is disposed between the first woven fabric layer and the second woven fabric layer. The intermediate layer can be formed by an intermediate woven fabric layer. The intermediate layer can also comprise non-woven material and/or foam material and/or a film/foil and/or a knitted fabric and/or a warp or weft-knitted fabric and/or a cross-laid structure, or be composed thereof.

The woven fabric layers form a sandwich arrangement. The first woven fabric layer may bear directly on the intermediate layer. The second woven fabric layer on the side that is opposite to the first woven fabric layer may likewise bear directly on the intermediate layer.

The first woven fabric layer and the second woven fabric layer include in each case electrically conductive warp threads and/or weft threads. The intermediate layer, or woven fabric layer, respectively, can also have electrically conductive warp threads and/or weft threads, or be formed completely from electrically non-conductive threads. The first woven fabric layer, the second woven fabric layer, and the intermediate layer, or woven fabric layer, respectively, form a sensor arrangement which has an electric property that varies while a force acts on said woven fabric layer.

The sensor arrangement can be a capacitive sensor arrangement and/or a piezoelectric sensor arrangement and/or a resistive, or a piezoresistive, respectively, sensor arrangement. The physical functional mode of the sensor arrangement depends on the embodiment of the intermediate layer. When the intermediate layer comprises yarns and is configured as a woven fabric layer, for example, the physical functional mode of the sensor arrangement depends on the yarn material. For example, if the intermediate woven fabric layer is composed of electrically non-conductive material, for example from electrically non-conductive threads, which material or threads, respectively, form a dielectric, a capacitive sensor arrangement in the manner of a plate capacitor is achieved. The intermediate layer, or woven fabric layer, respectively, can also comprise material or threads, respectively, which include piezoelectric material, such that a piezoelectric sensor arrangement is formed. Moreover, there is the possibility for the intermediate woven fabric layer to also comprise material or threads, respectively, from electrically conductive material, the electrical resistance thereof varying in the event of force or pressure, respectively, acting thereon, such that a resistive or piezoresistive, respectively, sensor arrangement is formed.

According to the present disclosure, an uppermost woven fabric layer of the woven fabric layers present in terms of weaving technology may be connected to one of the other woven fabric layers. Accordingly, a lowermost woven fabric layer of the woven fabric layers present in terms of weaving technology is connected to at least one of the other woven fabric layers. The uppermost woven fabric layer can be formed, for example, by the first woven fabric layer, and/or the lowermost woven fabric layer can be formed, for example, by the second woven fabric layer. It is also possible to in each case use a woven fabric layer of a separate binding system as the uppermost woven fabric layer and/or as the lowermost woven fabric layer, said binding system by way of bindings in terms of weaving construction indirectly connecting the first woven fabric layer, the second woven fabric layer, and the intermediate woven fabric layer to one another, while the first woven fabric layer, the second woven fabric layer, and the intermediate woven fabric layer merely bear on one another without any direct binding in terms of weaving technology.

Such a multi-layered woven fabric having two or more woven fabric layers can be produced directly on a weaving machine without post-processing in order for the woven fabric layers to be connected. When weaving the first woven fabric layer, the second woven fabric layer, and—in as far as the intermediate layer is embodied as a woven fabric layer— the intermediate woven fabric layer, the bindings in terms of weaving technology herein can be simultaneously produced in order for said three woven fabric layers to be connected directly and/or indirectly by way of a binding system to one another. Subsequent processing steps in which the woven fabric layers are interconnected by sewing, adhesive bonding, embroidering, or the like, can be dispensed with. The two or three woven fabric layers can be produced simultaneously on a weaving machine and in terms of weaving technology can be interconnected directly or indirectly by way of a binding system. This significantly reduces the complexity in the production of a multi-layered sensory woven fabric, because complex manual positioning, aligning, and connecting of the individual woven fabric layers is dispensed with.

The material of the intermediate layer may be in the form of yarns that are round in the cross section and/or of tape-shaped elements in the production of the first and second woven fabric layer can be disposed therebetween, in particular by a weft insertion and/or a warp insertion in a weaving machine, or when the intermediate layer is embodied as a woven fabric layer.

Moreover, the scatter of the sensor arrangement on account of production tolerances can be minimized by interconnecting the different woven fabric layers in terms of weaving technology. The tolerance region of the variation of an electrical property of the sensor arrangement, depending on the force acting thereon, or the pressure acting thereon, respectively, can be smaller than is the case in sensory woven fabrics in which the woven fabric layers are connected by adhesive bonding or sewing, or the like. The binding forces of the binding in terms of weaving technology can be set in a simple manner. The bindings in terms of weaving technology may be distributed uniformly across the area of the woven fabric. The local deviation of the variation of an electrical property of the sensor arrangement, depending on the force acting thereon, or the pressure acting thereon, can be kept minor by way of the density of the binding points and the distribution of the latter. This simplifies the calibration of the sensory woven fabric when used in a sensor device.

The woven fabric according to the present disclosure can also be referred to as a sensory multi-layered woven fabric. The latter is specified for localizing the influence of force or pressure, respectively, at specific locations. The woven fabric is thus capable of determining the point of the influence of force or pressure, respectively, in a manner resolved in terms of location, and optionally additionally also of characterizing the force or the pressure, respectively, acting thereon in terms of quantity. Such woven fabrics can be used in a diverse manner. Said woven fabrics can be installed on a ground, for example, so as to indicate the position of moving objects. On account thereof, it is possible, for example, to avoid collisions between moving objects, or between moving objects and static obstacles, respectively. Another potential application lies in equipping grippers, robotic arms, or the like, on the external face thereof with a sensory woven fabric such that any contact, and the point of contact of the gripper or the robotic arm, respectively, with an object can be determined. Diverse other applications are also possible.

Only three layers, or woven fabric layers, respectively, may be present. If said layers in terms of weaving technology are directly interconnected, the woven fabric can be composed exclusively of a total of three layers or woven fabric layers, respectively. In another refinement, additionally to the three layers or woven fabric layers, respectively, a binding system which forms the uppermost woven fabric layer and/or the lowermost woven fabric layer for fixing the three woven fabric layers can be present. Additional layers, for example woven fabric layers, for mechanical reinforcing, electrical insulation, electromagnetic shielding, etc., can likewise be present.

The first woven fabric layer may have electrically conductive strips and electrically non-conductive strips which are disposed beside one another in an alternating manner and which extend in the warp direction or in the weft direction. The formation of strips in the warp direction herein can be achieved in a very simple manner in that at least one electrically conductive warp thread is disposed in an electrically conductive strip and electrically non-conductive warp threads exclusively are disposed in an electrically non-conductive strip. In an analogous manner thereto, in order for an electrically conductive strip to be formed in the weft direction, at least one electrically conductive weft thread can be used, and electrically non-conductive weft threads exclusively can be used in an electrically non-conductive strip. It is moreover possible for the second woven fabric layer to have electrically conductive strips and electrically non-conductive strips which are disposed beside one another in an alternating manner and which extend in the warp direction or in the weft direction. Said strips, as has been explained in the context of the first woven fabric layer, can be produced when weaving.

In an exemplary refinement in each case one electrically conductive intermediate strip which is electrically isolated in relation to the two adjacent electrically conductive strips in this woven fabric layer can be interwoven in at least one electrically non-conductive strip in the first woven fabric layer or the second woven fabric layer. In particular, each electrically conductive intermediate strip in the first woven fabric layer or second woven fabric layer by means of a through-contacting arrangement can be connected to exactly one electrically conductive strip of the respective other woven fabric layer. On account thereof, an electrical connection of the woven fabric to an external circuit is possible by way of a single woven fabric layer and on a single woven fabric selvedge. The connector region on said woven fabric selvedge may extend only across one woven fabric selvedge region which can join, for example, a corner of the woven fabric. Means for plug-fitting a plug connection can be provided on this connector region.

The electrically conductive threads (warp threads or weft threads) that in an electrically conductive strip running in the direction of the strip may be electrically interconnected by at least one transverse contacting arrangement. It is ensured on account thereof that all electrical conductive warp threads or weft threads of said strip are directly electrically interconnected, and an electrical voltage or an electrical current can be taped on each of these electrically conductive warp threads or weft threads.

The transverse contacting arrangement can be established either by way of a suitable binding in conjunction with a matching warp density and weft density, or, for example, be formed by at least one electrically conductive weft thread or warp thread respectively, that runs transversely to the direction of the strip.

In an exemplary refinement the strips of the first woven fabric layer may be aligned transversely and orthogonally to the strips of the second woven fabric layer. For example, if the strips in the first woven fabric layer run in the warp direction, the strips in the second woven fabric layer thus run in the weft direction, for example, or vice versa. On account thereof, a lattice structure or a matrix structure, respectively, of conductive strips can be achieved.

The width of a conductive strip transverse to the extent of said strip in the warp direction or in the weft direction may be smaller than the width of an adjacent non-conductive strip. This design can be implemented in the first and/or the second woven fabric layer. The proportion of area of the woven fabric that can be utilized in a sensory manner can be maximized by minimizing the width of the non-conductive strips.

In an exemplary refinement a warp thread or a weft thread of the first woven fabric layer may from an electrically non-conductive strip in terms of weaving technology can form a binding with a weft thread or warp thread of another woven fabric layer. It is avoided on account thereof that the generation of the binding in terms of weaving technology has an influence on the sensory property of the woven fabric, or of the sensor arrangement, respectively. In particular, a direct electrical connection between the first woven fabric layer and the second woven fabric layer can be avoided on account thereof. Accordingly, a warp thread or a weft thread of the second woven fabric layer from an electrically non-conductive strip in terms of weaving technology can form a binding with a weft thread or a warp thread of another woven fabric layer.

In an exemplary refinement a binding system having electrically nonconductive binding warp threads and/or electrically non-conductive binding weft threads may be present. The binding system connects the three woven fabric layers in a quasi-indirect manner. The binding warp threads and/or the binding weft threads herein in terms of weaving technology can form binding points either only below one another and/or with one of the woven fabric layers.

When a binding system is present, the layers or woven fabric layers, respectively, may bear only on one another and in terms of weaving technology not to be directly interconnected.

BRIEF DESCRIPTION OF THE DRAWINGS

Further advantageous embodiments of the invention are apparent from the dependent claims, the description and also the drawing. Exemplary embodiments of the invention are explained in detail below with reference to the attached drawings. In the drawings:

FIG. 1 illustrates a heavily schematic sectional view of an exemplary embodiment of a woven fabric in a transverse manner with respect to the weft direction, FIG. 2 illustrates the woven fabric embodiment 1 in a schematic exploded view.

DESCRIPTION OF PREFERRED EMBODIMENTS

Figure 3:
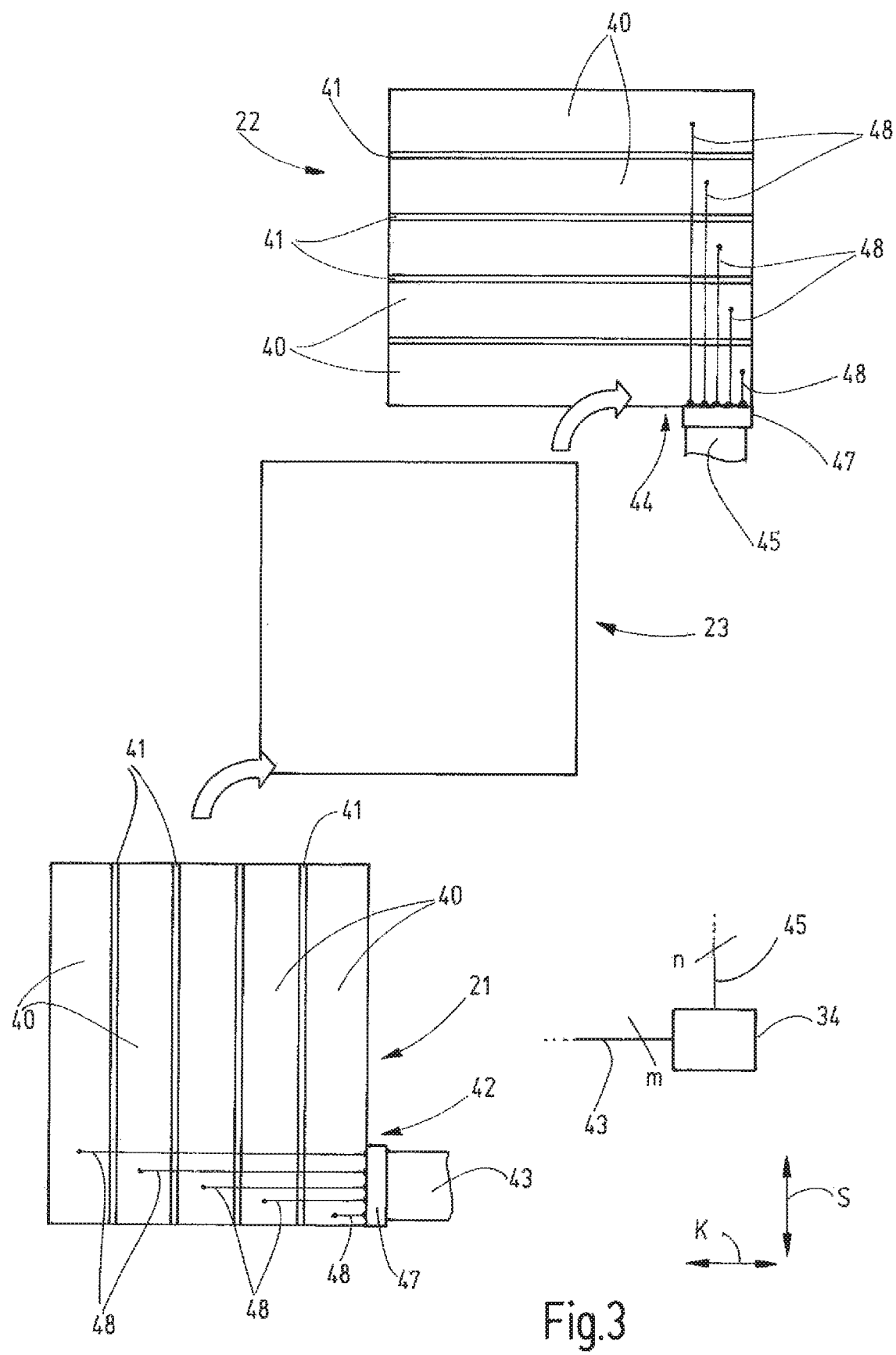
FIG. 3 illustrates in a block diagram-like manner an exploded view of the construction of the woven fabric in accordance with FIGS. 1 and 2.

FIGS. 1 to 8 illustrate schematically various illustrations and views of a multi-layer woven fabric 20. The woven fabric 20 has at least three and in the case of the exemplary refinement precisely three layers that are formed by way of example by means of woven fabric layers 21, 22, 23. Each woven fabric layer 21, 22, 23 respectively comprises multiple weft threads 24 and also warp threads 25. Apart from the undulation that is produced by the woven binding arrangements within a woven fabric layer 21, 22, 23 the warp threads 25 extend in a warp direction K and the weft threads 24 extend in a weft direction S that is oriented at a right angle with respect to the warp direction K. The weft direction S and the warp direction K span a plane in which the woven fabric 20 extends. At a right angle with respect to this plane in the weft direction S and warp direction K the woven fabric 20 has a thickness in a height direction H. The dimension of the woven fabric 20 in the height direction H is smaller than the dimension in the weft direction S and the dimension in the warp direction K, for example by at least the factor 10 to 100.

The weft threads 24 and the warp threads 25 of each woven fabric layer 21, 22, 23 are connected to one another within the relevant woven fabric layer 21, 22, 23 using a weaving technique. Optionally, the weft threads 24 and warp threads 25 of one of the woven fabric layers 21, 22, 23 may form woven binding arrangements directly with warp threads 25 or weft threads 24 of another of the woven fabric layers 21, 22, 23. In the case of the exemplary refinements that are illustrated in the drawings, the woven fabric layers 21, 22, 23 are not directly connected to one another using a weaving technique but rather a binding system 26 is provided that comprises binding weft threads 27 and binding warp threads 28. The woven fabric layers 21, 22, 23 are fastened to one another or against one another by way of example only via the binding system 26. The weft threads 24 and the warp threads 25 of each individual woven fabric layer 21, 22, 23 are in this case bound to one another using a weaving technique only within the respective woven fabric layer 21, 22, 23.

One of the woven fabric layers forms a first woven fabric layer 21 that comprises electrically conductive weft threads 24 and/or electrically conductive warp threads 25. A further woven fabric layer forms a second woven fabric layer 22 that likewise comprises electrically conductive weft threads 24 and/or electrically conductive warp threads 25. An intermediate woven fabric layer 23 is arranged between the first woven fabric layer 21 and the second woven fabric layer 22. The intermediate woven fabric layer 23 lies with one side directly against the first woven fabric layer 21 and with the opposite side directly against the second woven fabric layer 22. The three woven fabric layers 21, 22, 23 are held against one another in accordance with the example—as previously mentioned—by means of the binding system 26.

Alternatively or in addition thereto, non-woven material and/or foam and/or film material and/or other textile materials such as a knitted fabric and/or a worked fabric and/or a mat may be used as an intermediate layer in lieu of the woven fabric material. The material of the intermediate layer may be arranged between the first woven fabric layer and the second woven fabric layer in the form of yarns that are circular in cross section and/or band-shaped elements when producing said first woven fabric layer and second woven fabric layer, in particular by means of a weft insertion in a weaving machine.

The woven fabric 20 has an uppermost woven fabric layer LO and also a lowest woven fabric layer LU. Depending upon how the woven binding arrangement between the three woven fabric layers 21, 22, 23 is achieved and depending upon whether a binding system 26 is provided or not, the first woven fabric layer 21 may form the uppermost woven fabric layer LO and/or the second woven fabric layer 22 may form the lowest woven fabric layer LU.

Figure 10:
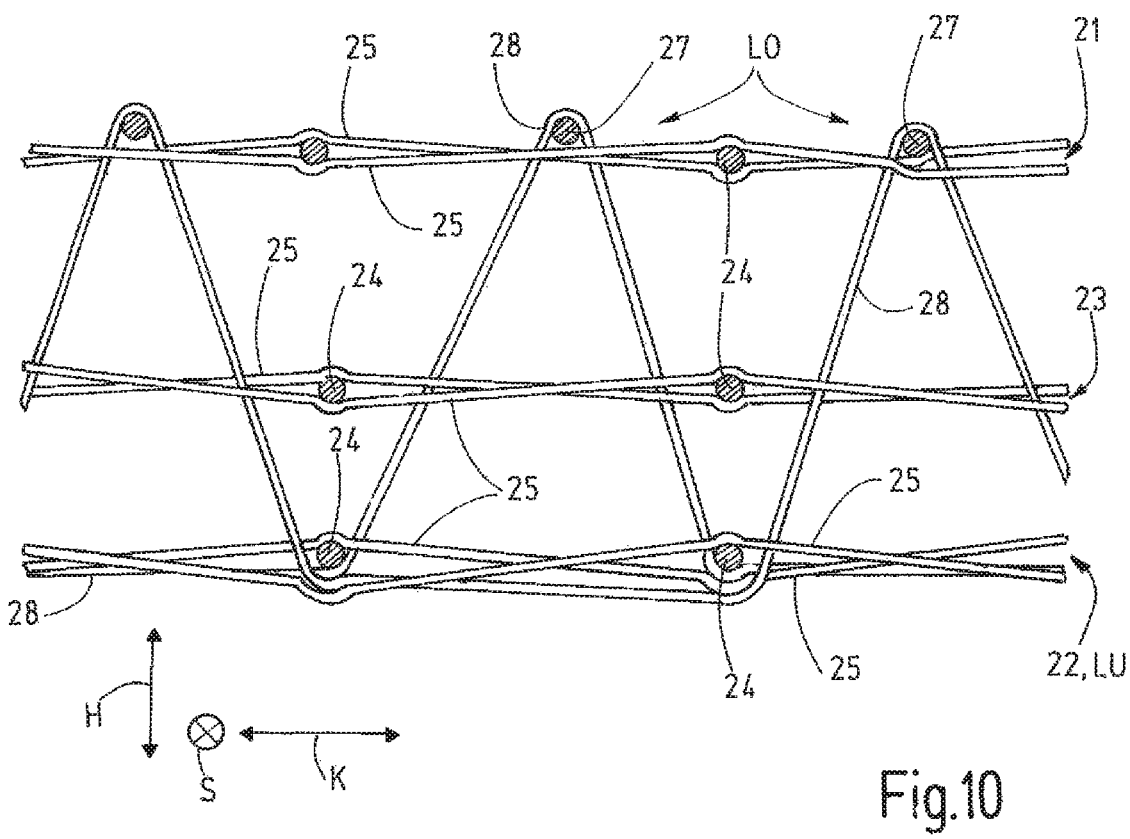

In the case of the refinement that is illustrated in FIG. 10, the binding weft threads 27 of the binding system 26 are only arranged adjacent to the first woven fabric layer 21. The binding warp threads 28 form woven binding arrangements with the binding weft threads 27 and also the weft threads 24 of the second woven fabric layer 22.

The binding system 26 may also be embodied without binding weft threads 27 and at least respectively a partial quantity of the weft threads 24 of the first woven fabric layer 21 and of the second woven fabric layer 22 are used so as to produce the woven binding arrangement sites. In the case of the refinement that is illustrated in FIG. 10, the uppermost woven fabric layer LO is formed by means of the binding weft threads 27 and the binding warp threads 28 adjacent to the first woven fabric layer 21. The second woven fabric layer 22 together with the binding warp threads 28 forms the lowest woven fabric layer LU. In the case of the examples of the binding system 26 that are illustrated in FIGS. 11 and 12, the binding warp threads 28 could be omitted.

Figure 11:
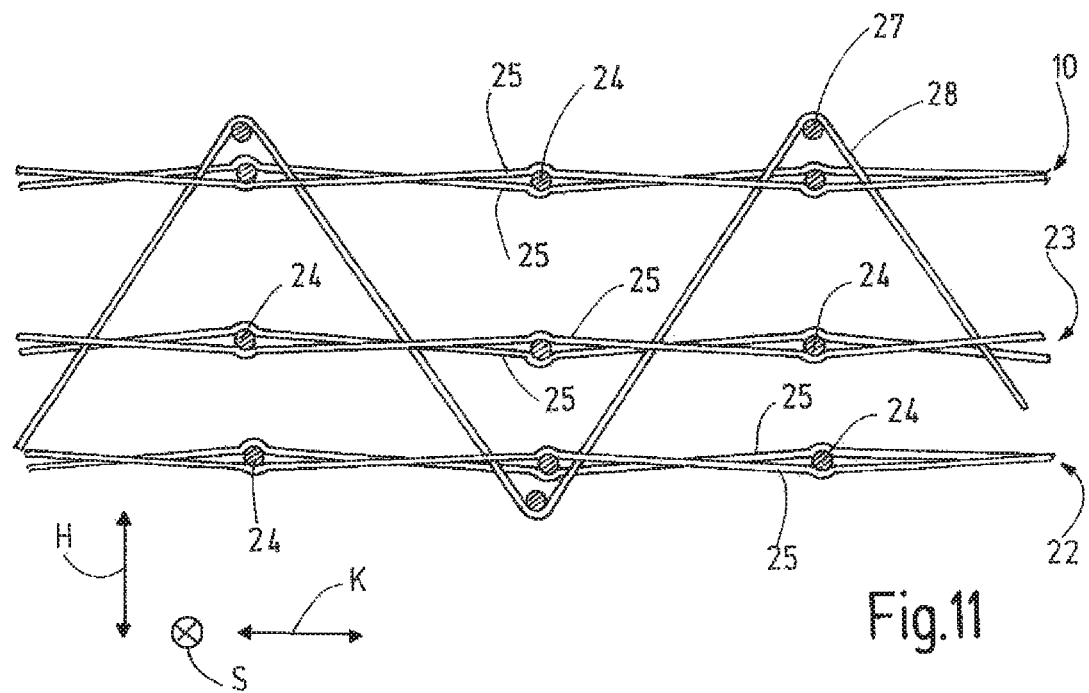
Figure 12:
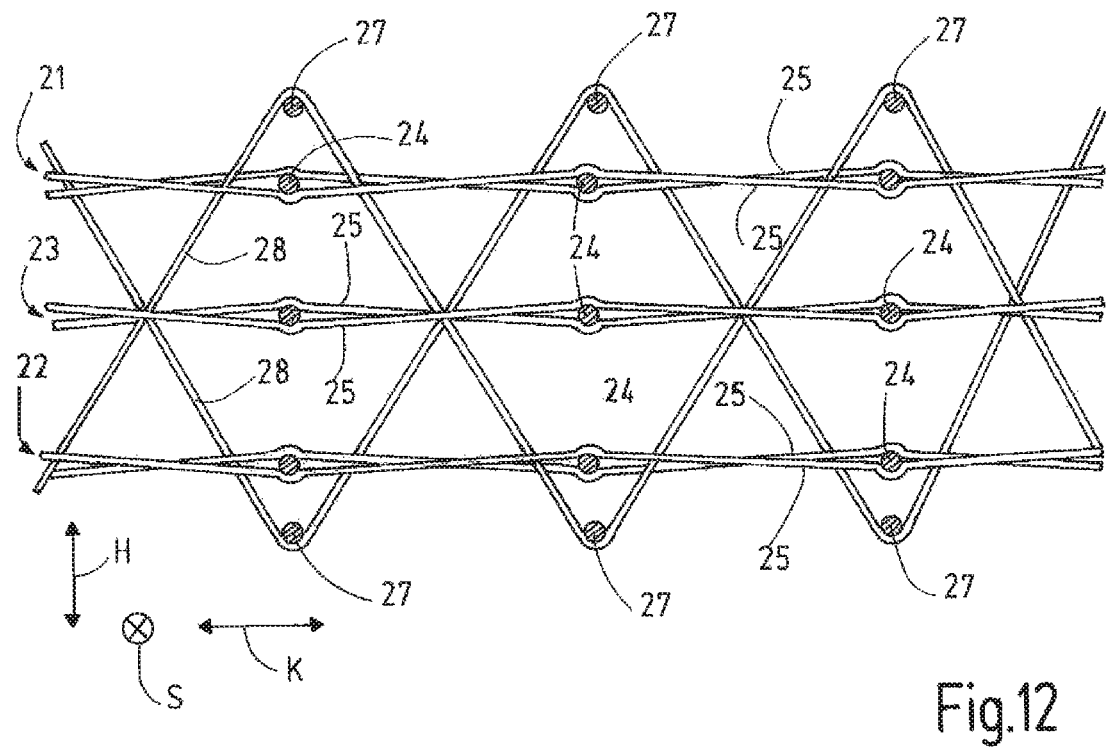
Figure 13:
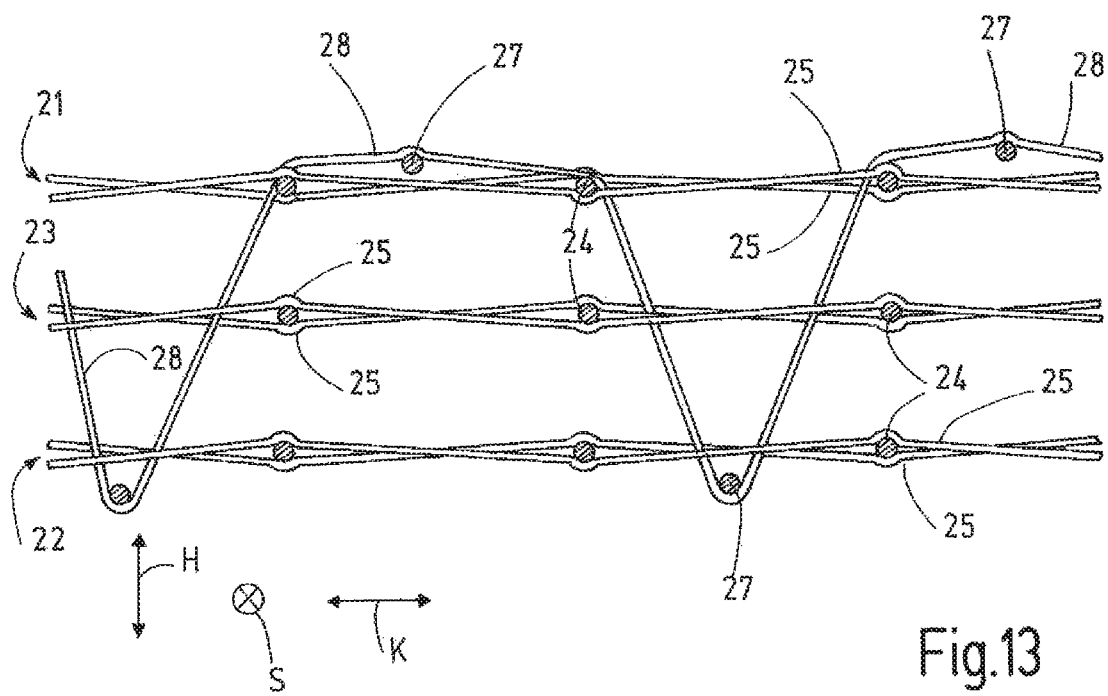

In the case of the further exemplary binding variants in accordance with the FIGS. 11 to 13 both the uppermost woven fabric layer LO as well as the lowest woven fabric layer LU are arranged respectively adjacent to the first woven fabric layer 21 or to the second woven fabric layer 22 and are formed by means of binding weft threads 27 and binding warp threads 28. The position of the binding weft threads 27 may be offset for this purpose in the warp direction K at approximately the height of the weft threads 24 of the woven fabric layers 21, 22, 23 (FIGS. 11 and 12) or in the warp direction K (FIG. 13). The number of the binding weft threads 27 may deviate from the number of the weft threads 24 of the woven fabric layers 21, 22, 23 per length section of the woven fabric in the warp direction K. For example, in the case of the refinement in FIG. 12 double the number of binding weft threads 27 are used per length section as in the woven fabric layers 21, 22, 23.

The type of the woven binding arrangements within a woven fabric layer 21, 22, 23 and also the type of the woven binding arrangement by means of the binding system 26 may be selected in principle in an arbitrary manner. Satin weaves, plain weaves, twill weaves, leno weaves etc. may be used. The types of binding arrangements in the woven fabric layers 21, 22, 23 may be identical or—in a departure from the illustrated exemplary refinements—may also differ from one another.

Different yarns and/or different yarn thicknesses and/or varying numbers of yarns and/or different yarn cross sections may be used in the woven fabric layers 21, 22, 23 and also in the binding system 26. By way of example, band-shaped weft threads and/or band-shaped warp threads may be used in the intermediate layer or intermediate woven fabric layer 23.

As is evident in the above explanations, in accordance with the example at least three woven fabric layers 21, 22, 23 are provided and optionally additionally one or two woven fabric layers that are formed by means of the binding system 26 and that may form the uppermost woven fabric layer LO adjacent to the first woven fabric layer 21 and/or the lowest woven fabric layer LU adjacent to the second woven fabric layer 22.

Figure 6:
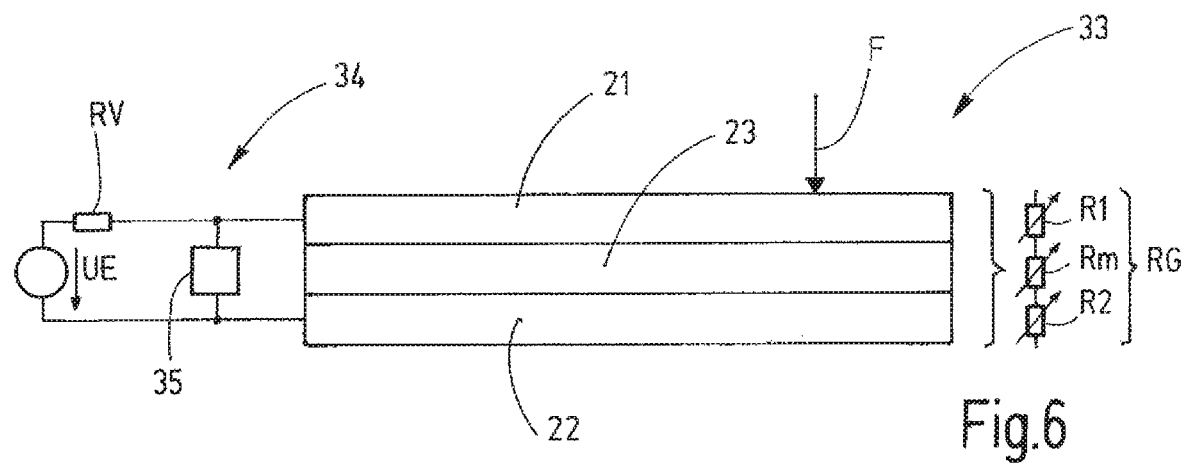
Figure 7:
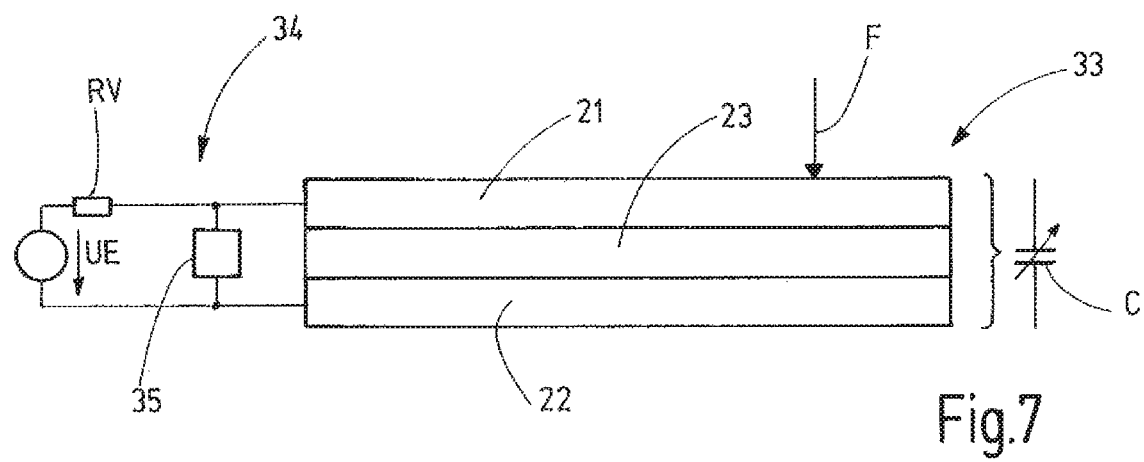
Figure 8:
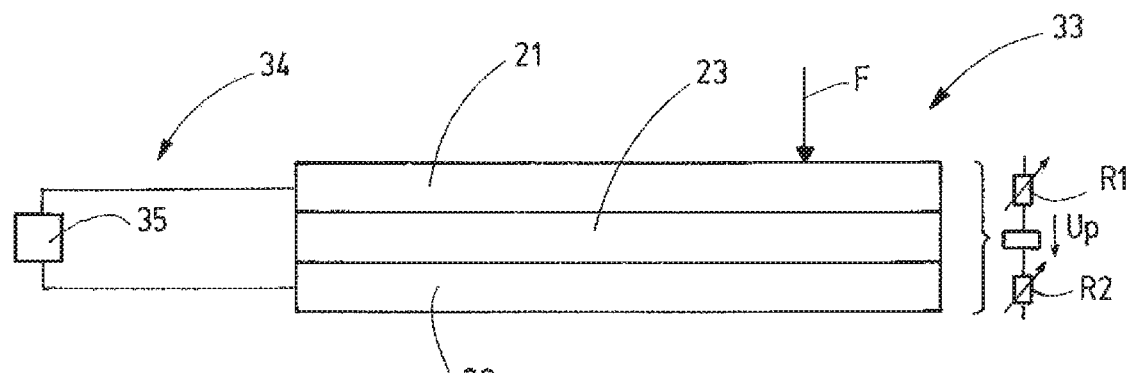

The woven fabric layers 21, 22, 23 together form a sensor arrangement 33 (FIGS. 6-8). The sensor arrangement 33 has at least one changing electrical characteristic. By way of example, the sensor arrangement 33 may comprise a total resistance RG that changes depending upon a force F that is acting upon the sensor arrangement 33, a changing capacitance C or a changing piezo voltage Up. The electrical characteristics of the sensor arrangement 33 depend upon the yarn characteristics, in particular in the intermediate woven fabric layer 23.

In the case of the refinement of FIG. 6 the intermediate woven fabric layer 23 comprises electrically conductive weft threads 24 and/or warp threads 25 that comprise piezoresistive material with the result that the piezoresistive resistance Rm of the intermediate woven fabric layer 23 changes depending upon the force F that is acting upon the woven fabric layers. The piezoresistive resistance Rm is the through-going resistance of the intermediate woven fabric layer 23 when a current is flowing from the first woven fabric layer 21 through the intermediate woven fabric layer 23 into the second woven fabric layer 22 or conversely. Moreover, by means of a force F that is acting upon the woven fabric layers a first transition resistance R1 is formed between the first woven fabric layer 21 and the adjacent intermediate woven fabric layer 23 and also a second transition resistance R2 is formed between the second woven fabric layer 22 and the intermediate woven fabric layer 23, said transition resistance changing depending upon the force F that is acting upon the woven fabric layers. The three woven fabric layers therefore generate a series circuit from a first transition resistance R1, a piezoresistive resistance Rm and also a second transition resistance R2 that respectively change depending upon the force F that is acting upon the woven fabric layers. This series circuit has a total resistance RG that is provided from the sum of the first transition resistance R1, the piezoresistive resistance Rm and the second transition resistance R2.

The first woven fabric layer 21 and the second woven fabric layer 22 are connected to an evaluating circuit 34. An external voltage UE may be applied here by means of the evaluating circuit via an optional series resistor RV between the first woven fabric layer 21 and the second woven fabric layer 22. The series resistor RV may in this case be connected in series to the total resistance RG. In this case, it is possible via an evaluating unit 35 of the evaluating circuit 34 to evaluate the voltage that is prevailing at the total resistance RG and/or the current that is flowing through the evaluating circuit 34 or the sensor arrangement 33 since the voltage that is prevailing at the total resistance RG or the current that is flowing through the total resistance RG changes depending upon the force F that is acting upon the woven fabric layers. The external voltage UE may be a direct current voltage. As is illustrated schematically in FIG. 6, the evaluating unit 35 in accordance with the example evaluates the voltage that is prevailing at the total resistance RG. The evaluating unit 35 may be connected parallel to a measuring resistor so as to evaluate a current, said measuring resistor in turn being connected in series to the total resistance RG of the sensor arrangement 33. By way of example, the series resistor RV may also be used as a measuring resistor.

In the case of a further refinement, the sensor arrangement 33 is embodied as a capacitive sensor arrangement (FIG. 7). The intermediate woven fabric layer 23 in this case forms a dielectric and the first woven fabric layer 21 and the second woven fabric layer 22 are embodied as electrodes and correspond so to speak to the plates of a plate capacitor. The evaluating circuit 34 that is connected to the sensor arrangement 33 corresponds to the refinement according to FIG. 6 with the result that reference may be made to the above explanation. The sensor arrangement 33 deforms depending upon the force F that is acting upon the woven fabric layers with the result that the spacing between the first woven fabric layer 21 and the second woven fabric layer 22 changes at the site at which the force F occurs. In this case, the capacitance C of the sensor arrangement 33 changes, which may be ascertained by means of the evaluating circuit 34 or the evaluating unit 35. In this case, the evaluating unit 35 may measure the voltage that prevails between the first woven fabric layer 21 and the second woven fabric layer 22. A direct current voltage may be applied as an external voltage UE.

In the case of the exemplary embodiment of the sensor arrangement 33 that is illustrated in FIG. 8, the intermediate woven fabric layer 23 comprises weft threads 24 or warp threads 25 that include piezoelectric material and therefore may generate a piezovoltage Up. The piezovoltage Up and moreover the first transition resistance R1 and the second transition resistance R2 changes depending upon the force F that is acting upon the woven fabric layers. The voltage that prevails between the first woven fabric layer 21 and the second woven fabric layer 22 may be ascertained and evaluated by means of the evaluating circuit 34. It is not necessary in this case to apply an external voltage and the evaluating circuit 34 may only comprise the evaluating unit 35 that is connected to the first woven fabric layer 21 and the second woven fabric layer 22.

Consequently, the sensor arrangement 33 in the case of refinements in which a current may flow from the first woven fabric layer 21, through the intermediate woven fabric layer 23 to the second woven fabric layer 22—or in the opposite direction—may comprise a series circuit of multiple and in accordance with the example three changing electrical characteristics that change in a localized manner depending upon the force F that is acting upon the relevant site.

Figure 9:
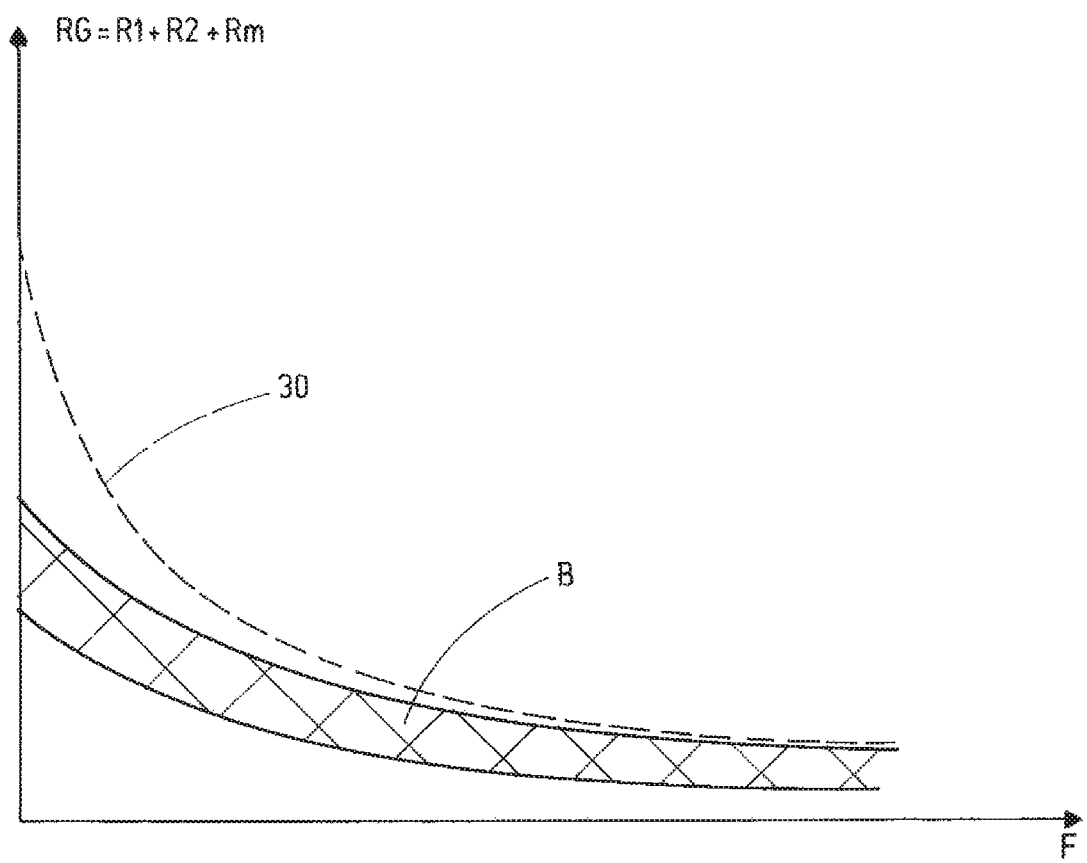
FIG. 9 illustrates a schematic diagram of a qualitative curve of an ohmic total resistance in dependence upon the force F that is acting upon the woven fabric in the case of a resistive sensor arrangement of FIG. 6, FIGS. 10 to 13 respectively illustrate a schematic diagram of different woven binding arrangements by means of a binding system of the woven fabric

The procedure of connecting the woven fabric layers 21, 22, 23 using a weaving technique with or without a binding system 26 has the advantage that the spread of the sensor arrangement 33 may be more closely limited. The total resistance RG in dependence upon the force F that is acting upon the woven fabric layers is illustrated in FIG. 9 in an exemplary manner with reference to the refinement of the sensor arrangement 33 in accordance with FIG. 6. The woven fabric layers 21, 22, 23 are not sewn to one another or adhered to one another or the like. It has been found that the tolerance range B of the total resistance RG that is dependent upon the force F, said tolerance range occurring owing to production tolerances, may be limited with respect to other multi-layer sensory woven fabrics by means of only connecting the woven fabric layers 21, 22, 23 using a weaving technique. The tolerance range B that occurs on account of the connection of the woven fabric layers using a weaving technique is illustrated schematically in FIG. 9 by a crosshatched pattern. In contrast, the tolerance range B increases if the woven fabric layers 21, 22, 23 are connected to one another after their production procedure by way of example by means of sewing or other mechanical means, which is illustrated schematically by means of the dashed upper limit BO in FIG. 9 that is displaced with respect to the upper limit of the tolerance range B of the woven fabric 20 in accordance with the present disclosure. In the case of the refinement that is described here, only a woven binding arrangement may therefore be produced between the woven fabric layers 21, 22, 23 without an additional mechanical, physical or chemical connection between the woven fabric layers 21, 22, 23 being produced.

It is apparent in the FIGS. 2 to 5 that the first woven fabric layer 21 in accordance with the example comprises electrically conductive strips 40 and electrically non-conductive strips 41 in an alternating manner in the weft direction S. By way of example, in an electrically conductive strip 40 at least some or all of the weft threads 24 are electrically conductive while only electrically non-conductive weft threads 24 are arranged in the electrically non-conductive strips 41. The warp threads 25 of the first woven fabric layer 21 may be electrically non-conductive in the case of a refinement in particular if the electrically conductive warp threads 24 that are provided in a conductive strip 40 are in electrical contact with one another. Alternatively, it is also possible that at least some or all of the warp threads 25 of the first woven fabric layer 21 are electrically conductive and respectively form a transverse contacting arrangement 39 in one or all of the electrically conductive strips 40. If electrically conductive warp threads 25 are used as transverse contacting arrangements 39 it is necessary to prevent the electrically conductive strips 40 electrically short-circuiting by means of these warp threads 25. For this purpose, the electrically conductive warp threads are unwoven in the region of the electrically non-conductive strip 41 with the result that an electrical connection is interrupted. For this purpose, by way of example an electrically conductive warp thread 25 within a non-conductive strip 41 may form a floating stitch that may be severed at two sites that are spaced apart from one another. The severed part of the warp thread 25 may be removed. The separation of an electrically conductive warp thread 25 that respectively forms a transverse contacting arrangement 39 in the electrically conductive strips 40 is illustrated in a greatly schematic manner in FIG. 4.

The second woven fabric layer 22 forms extending in the warp direction K electrically conductive strips 40 and electrically non-conductive strips 41 that are arranged adjacent to one another in an alternating manner in the weft direction S. In an electrically conductive strip 40 some or all of the warp threads 25 may be electrically conductive and only electrically non-conductive warp threads 25 are used in a non-conductive strip 41. If one of the or multiple weft threads 24 in the second woven fabric layer 22 for forming a transverse contacting arrangement 39 are electrically conductive (similar to the description of the first woven fabric layer 21), an electrical connection between the electrically conductive strip 40 may be prevented by means of the relevant electrically conductive weft thread 24 by virtue of the fact that this weft thread is severed in the region of the electrically non-conductive strip 41. The relevant electrically conductive weft thread 24 within each non-conductive strip 41 may be severed at two sites that are spaced apart from one another and the part of the weft thread 24 that is severed is removed. For this purpose, the relevant weft thread 24 at least in one range of the respective electrically non-conductive strip 41 may comprise a floating stitch that is severed.

The transverse contacting arrangement 39 in an electrically conductive strip 40 may be produced in one or the two woven fabric layers 21, 22 alternatively or in addition also by means of sewing and/or stitching using an electrically conductive yarn and/or applying an electrically conductive layer, by way of example by means of bonding and/or pressing and/or spraying etc.

The direction of extent of the strips 40, 41 in the first woven fabric layer 21 is oriented at a right angle with respect to the direction of extent of the strips 40, 41 in the second woven fabric layer 22. In a deviation from the illustrated refinement, the strips 40, 41 in the first woven fabric layer 21 could also extend in the warp direction and the strips 40, 41 in the second woven fabric layer 22 could also extend in the weft direction S.

A so to speak grid structure or matrix structure occurs by means of the described arrangement of the electrically conductive strips 40 and the electrically nonconductive strips 41 in the first woven fabric layer 21 and the second woven fabric layer 22. When a force F acts upon the woven fabric 20 or the sensor arrangement 33, it is consequently possible to determine at which site the force F acts upon the woven fabric surface of the woven fabric 20. In this case, the spatial resolution depends on the number and the width of the strips 40, 41. The electrically non-conductive strips 41 may comprise as small a width as possible in a transverse manner with respect to their direction of extent with the result that the electrical insulating arrangement is ensured between the respective adjacent electrically conductive strips 40 but as large a proportion as possible of the surface may be used as an active sensor surface.

Figure 4:
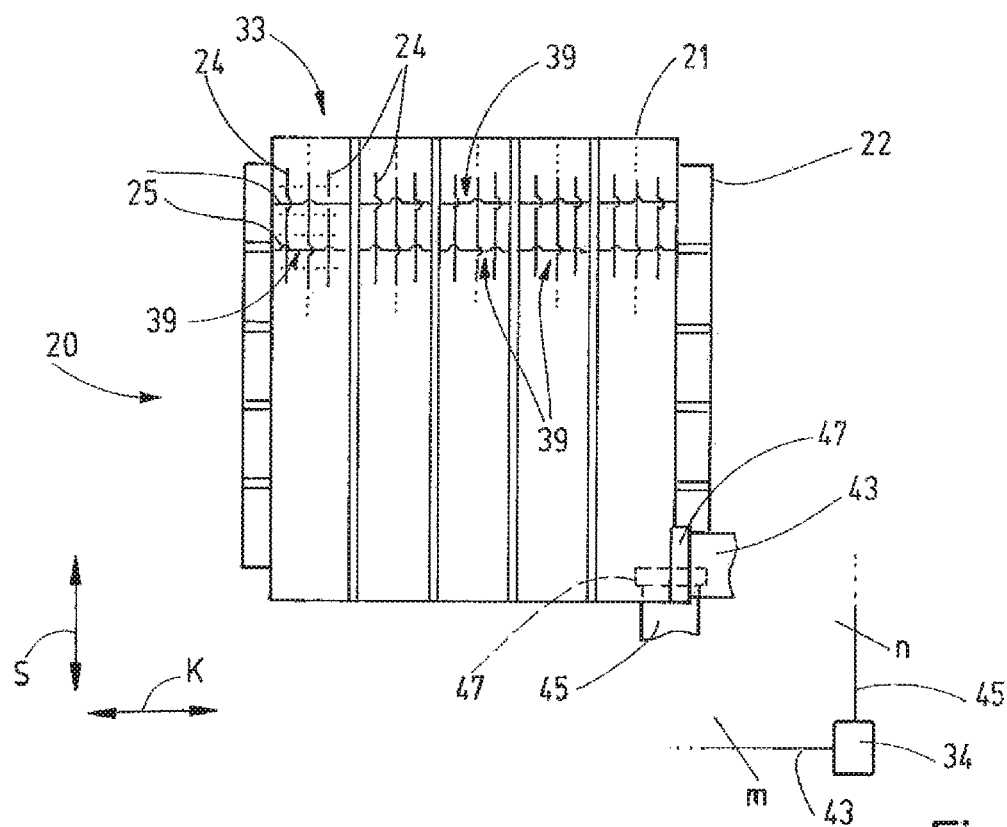
FIG. 4 illustrates in a block diagram-like manner the woven fabric of FIG. 3 if an electrical contacting arrangement has been produced.

In the case of the refinement in accordance with FIGS. 3 and 4, the electrically conductive strips 40 of the first woven fabric layer 21 are electrically connected on a single side by way of example on a first side 42 to a first line 43. The first line 43 comprises a corresponding number of conductors or wires depending upon the number of the conductive strips 40. In this refinement, the first line 43 has m wires or conductors (m=2, 3, 4 . . . ).

Accordingly, the conductive strips 40 of the second woven fabric layer 22 are electrically connected to a second line 45 on one single side and in accordance with the example on a second side 44. The second line 45 has multiple conductors or wires corresponding to the number of the electrically conductive strips 40 and in the refinement in accordance with the example n conductors or wires (n=2, 3, 4, . . . ). The number m and the number n may be identical or may differ from one another.

The lines 43, 45 may be electrically connected to the electrically conductive strips 40 respectively via a plug 47 or another connecting means directly in a connecting region, by way of example on the woven fabric edge of the relevant woven fabric layer 21, 22. A connecting means may therefore be provided on this connecting region so as to mount a plug 47. For this purpose, electrically conductive connecting conductors 48 that extend in a transverse manner with respect to the electrically conductive strips 40 in the woven fabric structure of the relevant woven fabric layer 21, 22 may be provided or alternatively may be applied to the woven fabric layer 21, 22. The connecting conductors 48 by way of example may be electrically conductive weft threads 24 (for example in the first woven fabric layer 21) or electrically conductive warp threads 25 (for example in the second woven fabric layer 22). Each connecting conductor 48 is only electrically connected respectively to one of the electrically conductive strips 40 and a contacting arrangement in the connecting region and is electrically insulated with respect to the other electrically conductive strips 40. The installation space that is required for the connecting region so as to connect the plug 47 or the lines 43, 45 on the woven fabric edge may be particularly small here and the outlay for producing the electrical connection is small. When a sensory woven fabric 20 is being laid on site, it is only necessary to lay and connect the external first or second line 43, 45. All the other electrical contacting arrangements may already be produced earlier during the production procedure.

As is illustrated in FIG. 4, the first side 42 and the second side 44 are arranged adjacent to one another, wherein one of the two sides and in accordance with the example the first side 42 extends in the warp direction K and the respective other of the two sides and in accordance with the example the second side 44 extends in the weft direction S. As a consequence, a simple electrical contacting arrangement is also possible in the case of comparatively large surfaces on two adjacent sides 42, 44.

The evaluating circuit 34 is connected to the lines 43, 45. In the evaluating circuit 34, it is not only possible to identify that a force F is acting upon the woven fabric 20 or the sensor arrangement 33 but rather it is also possible to determine at which crossing site between an electrically conductive strip 40 of the first woven fabric layer 21 and an electrically conductive strip 40 of the second woven fabric layer 22 the force F acts since all the electrically conductive strips 40 are connected via separate conductors to the evaluating circuit 34.

Figure 5:
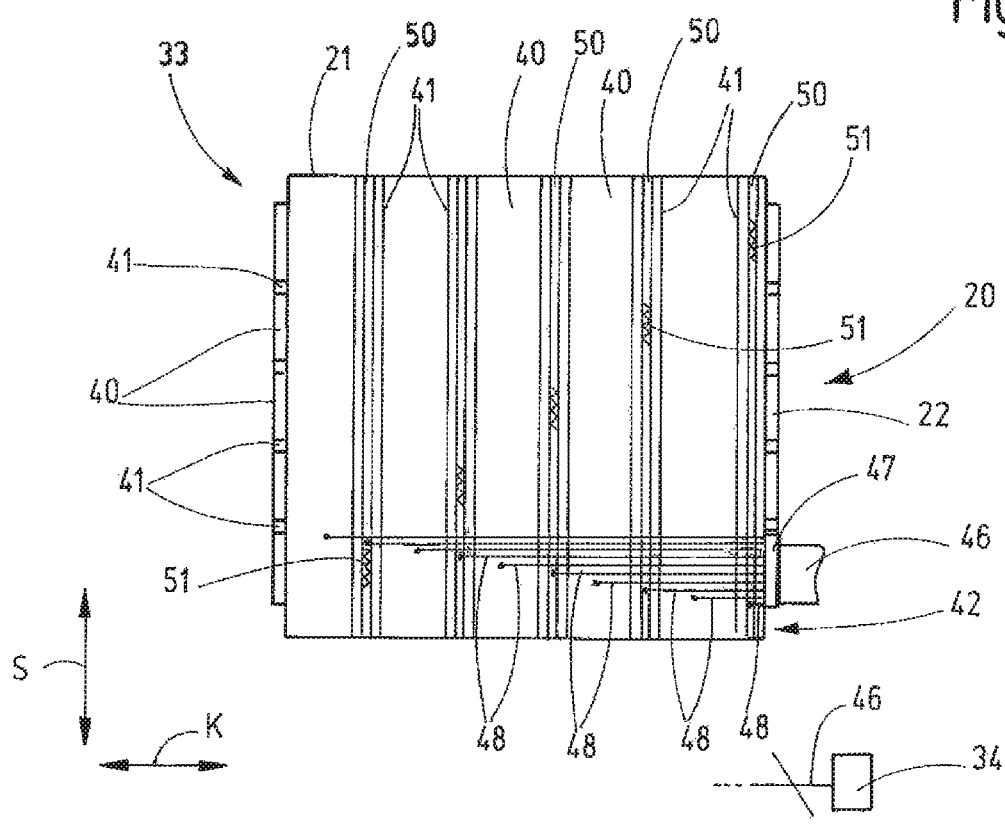
FIG. 5 illustrates in a block diagram-like manner an alternative embodiment of the woven fabric, FIGS. 6 to 8 respectively illustrate schematically an exemplary embodiment of a sensor arrangement that is formed by means of the woven fabric.

A further refinement for simplifying the electrical contacting arrangement between the sensor arrangement 33 and the evaluating circuit 34 is illustrated in FIG. 5. There, both the electrically conductive strips 40 of the first woven fabric layers 21, as well as the electrically conductive strips 40, of the second woven fabric layer 22 are electrically connected to a common line 46 on a common side and in accordance with the example on the first side 42 of the woven fabric 20. The common line 46 comprises a number of wires or conductors, said number corresponding to at least the sum of the number of electrically conductive strips 40 of the first woven fabric layers 21 and the number of electrically conductive strips 40 of the second woven fabric layer 22. The electrical contacting arrangement of the woven fabric is consequently achieved only on one single woven fabric edge and is consequently further simplified, in particular in the case of large-scale woven fabrics 20 that are used by way of example as a floor covering.

In order to render the contacting arrangement possible on a single side via a common line 46, an electrically conductive intermediate strip 50 is woven either in the first woven fabric layer 21 or the second woven fabric layer 22 in each electrically non-conductive strip 41 respectively. The electrically conductive intermediate strip 50 is electrically insulated with respect to the two adjacent electrically conductive strips 40 of the woven fabric layer 21 or 22, by way of example are arranged spaced apart. Each electrically conductive intermediate strip 50 is connected by means of a through-contacting arrangement 51 to precisely one electrically conductive strip 40 of the respective other woven fabric layers 22 or 21. The through-contacting arrangement 51 may be achieved by virtue of the fact that at least one electrically conductive thread connects the intermediate strip 50 to the respectively allocated electrically conductive strip 40 of the respective other woven fabric layer 22 or 21. In the refinement that is illustrated in FIG. 5, the electrically conductive intermediate strips 50 are provided in the first woven fabric layer 21 and produce by means of the through-contacting arrangements 51 connections to the electrically conductive strips 40 of the second woven fabric layer 22. Consequently, the electrical contacting arrangement of each electrically conductive strip 40 of the second woven fabric layer 22 may be provided via the through-contacting arrangement 51 and the electrically conductive intermediate strip 50 on the first woven fabric layer 21 and therefore on a common side of the woven fabric 20. Apart from that, the connection to the common line 46 is provided via connecting conductors 48 from the electrically conductive strips 40 and intermediate strips 50, as was described in connection with FIGS. 3 and 4.

The at least one thread of the through-contacting arrangement 51 may be an electrically conductive warp thread and/or electrically conductive weft thread of at least one of the strips 40, 50 that are to be connected and for example the electrically conductive intermediate strip 50 that is connected to the respectively allocated electrically conductive strip 40 using a weaving technique during the procedure of producing the woven fabric 20 or vice versa.

In an alternative to the illustrated refinement, the through-contacting arrangements 51 may also be produced by means of other electrical connections subsequent to producing the woven fabric 20, by way of example by means of sewing a conductive bar, by means of introducing a rivet that is embodied from electrically conductive material, etc. However, the through-contacting arrangement 51 may already be produced when weaving the woven fabric 20 on a weaving machine.

A through-contacting arrangement 51 penetrates the intermediate layer 23. An electrical connection to the intermediate layer 23 may be produced in this case depending upon the embodiment of the sensor arrangement 33 if said intermediate layer comprises electrically conductive components in the region of the through-contacting arrangement 51, by way of example in the case of the refinement according to FIG. 6. In the unloaded state of the sensor arrangement 33, the electrical resistance Rm of the intermediate layer 23 is sufficiently great that the electrical connection of the through-contacting arrangement 51 to the intermediate layer 23 does not impair the function. It is also possible to prevent the electrical connection between the through-contacting arrangement 51 and the intermediate layer 23 by means of insulating measures.

Figure 14:
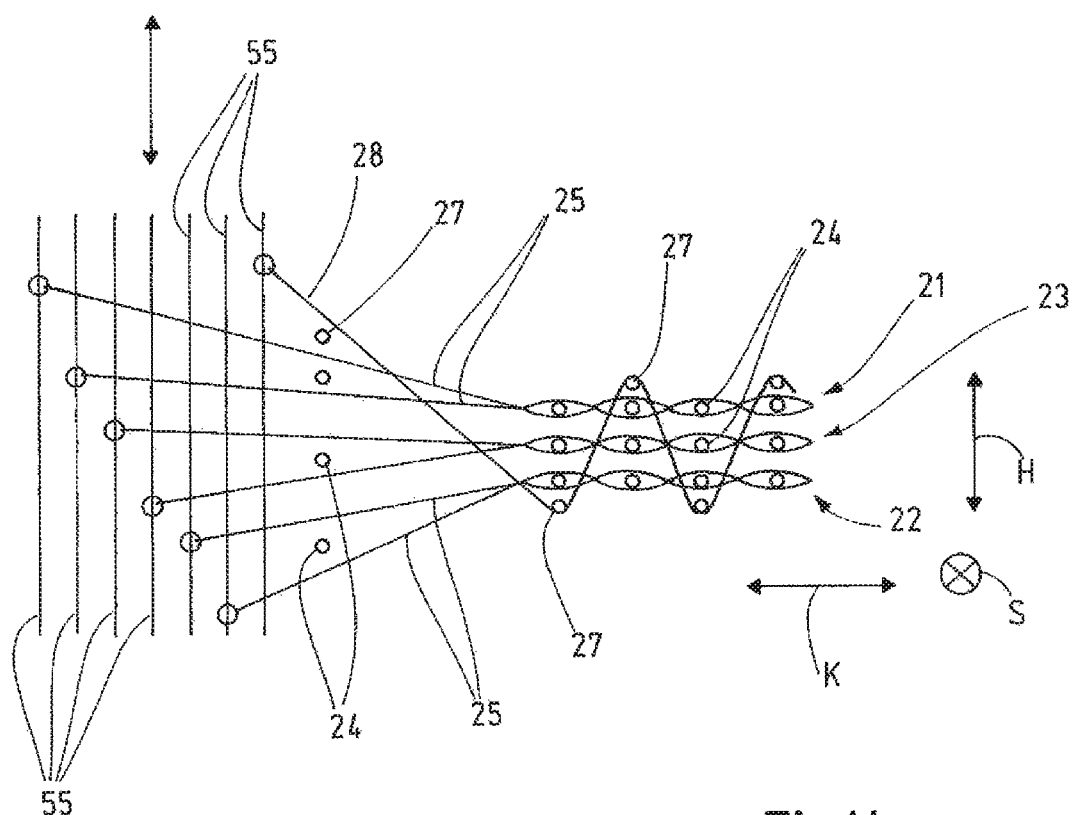
FIG. 14 illustrates an exemplary schematic diagram of the weaving procedure for weaving the woven fabric on a weaving machine.

FIG. 14 illustrates a weaving procedure in a greatly schematic manner similar to a block diagram as said weaving procedure may be performed on a weaving machine so as to produce the woven fabric 20. The weaving machine comprises at least and by way of example precisely seven heald wires 55. The heald wires 55 may move in the height direction H independently of one another upwards and downwards and respectively guide the warp threads 25 of one of the woven fabric layers 21, 22, 23 or the binding warp threads 28. It is possible to introduce and beat into place the weft threads 24 or the binding weft threads 27 by means of creating an appropriate shed. The manner in which the shed is formed and the number of the weft threads 24 or binding weft threads 27 that are threaded depend on the desired type of binding arrangement and may vary. FIG. 14 illustrates one of many possibilities in a purely exemplary manner.

Possibilities for producing the woven fabric 20 using a weaving machine are disclosed by way of example in the publication of Pelin Gurkan Unal with the title "3D-Woven Fabrics" (published in "Woven Fabrics", edited by Han-Yong Jeon, ISBN 978-953-51-0607-4) which may be found using the link http://www.intechopen.com/books/woven-fabrics.

The present disclosure relates to a multi-layered sensory woven fabric 20 having a plurality of, and according to the example, three woven fabric layers 21, 22, 23. Each woven fabric layer 21, 22, 23 has weft threads 24 and warp threads 25. A binding system 26 having binding weft threads 27 and binding warp threads 28 can optionally be provided. The woven fabric layers 21, 22, 23 in terms of weaving technology are directly and/or indirectly fastened to one another by way of the binding system 26. The connection between the woven fabric layers 21, 22, 23 is produced by weaving in the production of the woven fabric layers 21, 22, 23. Subsequent connecting of the woven fabric layers 21, 22, 23 can therefore be dispensed with.

What is claimed is:
1. A woven fabric having comprising at least three layers disposed on top of one another, wherein:
   two of the at least three layers are woven fabric layers;
   one of the woven fabric layers forms a lowermost woven fabric layer;
   another of the woven fabric layers forms an uppermost woven fabric layer;
   one of the woven fabric layers forms a first woven fabric layer that has electrically conductive warp threads and/or electrically conductive weft threads;
   another of the woven fabric layers forms a second woven fabric layer that has electrically conductive warp threads and/or electrically conductive weft threads;
   a further one of the layers forms an intermediate layer that is disposed between the first woven fabric layer and the second woven fabric layer;

the first woven fabric layer, the second woven fabric layer, and the intermediate layer form a sensor arrangement that has an electrical property that varies while a force acts on the layers;

the uppermost woven fabric layer in terms of weaving technology is connected to another one of the woven fabric layers;

the lowermost woven fabric layer in terms of weaving technology is connected to another one of the woven fabric layers;

a binding system connects the woven fabric layers by forming bindings in terms of weaving technology;

the binding system comprises electrically non-conductive binding warp threads and electrically non-conductive binding weft threads; and the first woven fabric layer, the second woven fabric layer, and the intermediate layer in terms of weaving technology are indirectly interconnected by the binding system.

2. The woven fabric according to claim 1, wherein the uppermost woven fabric layer is formed by the first woven fabric layer.

3. The woven fabric according to claim 1, wherein the lowermost woven fabric layer is formed by the second woven fabric layer.

4. The woven fabric according to claim 1, wherein the intermediate layer is a woven fabric layer.

5. The woven fabric according to claim 1, wherein no more than three of the at least three fabric layers are woven fabric layers are present.

6. The woven fabric according to claim 1, wherein the first woven fabric layer has electrically conductive strips and electrically non-conductive strips that are disposed in an alternating manner and that extend so as to be mutually parallel in the warp direction or in the weft direction.

7. The woven fabric according to claim 6, wherein the second woven fabric layer has electrically conductive strips and electrically non-conductive strips that are disposed in an alternating manner and that extend so as to be mutually parallel in the warp direction or in the weft direction.

8. The woven fabric according to claim 7, wherein the strips of the first woven fabric layer are aligned transversely to the strips of the second woven fabric layer.

9. The woven fabric according to claim 7, wherein:

in each case one electrically conductive intermediate strip is interwoven in at least one electrically non-conductive strip in the first woven fabric layer or the second woven fabric layer, and the electrically conductive intermediate strip is electrically isolated in relation to the two adjacent electrically conductive strips in the woven fabric layer.

10. The woven fabric according to claim 9, wherein each electrically conductive intermediate strip in the first or second woven fabric layer is connected by means of a through-contacting arrangement to exactly one electrically conductive strip of the respective other woven fabric layer.

11. The woven fabric according to claim 6, wherein the first woven fabric layer and the second woven fabric layer on a common side of the woven fabric are electrically connected to an evaluating circuit.

12. The woven fabric according to claim 6, wherein the electrically conductive threads that in an electrically conductive strip run in the direction of the strip are electrically inter-connected by at least one transverse contacting arrangement.

13. The woven fabric according to claim 6, wherein at least one warp thread or at least one weft thread of the first woven fabric layer from one electrically non-conductive strip in terms of weaving technology forms a binding with a weft thread or warp thread of another woven fabric layer.

14. The woven fabric according to claim 6, wherein at least one warp thread or at least one weft thread of the second woven fabric layer from one electrically non-conductive strip in terms of weaving technology forms a binding with a weft thread or warp thread of another woven fabric layer.

15. The woven fabric according to claim 1, wherein the binding system in terms of weaving technology for connecting the first woven fabric layer, the second woven fabric layer, and the intermediate layer is formed in the production of the first woven fabric layer and the second woven fabric layer.

16. A method for producing the woven fabric of claim 1, wherein the first woven fabric layer and the second woven fabric layer are produced on a common weaving machine.

17. A method for producing the woven fabric of claim 1, wherein:

the intermediate layer is embodied as a woven fabric layer; and the first woven fabric layer, the second woven fabric layer, and the intermediate layer are produced on a common weaving machine.

\* \* \* \* \*

UNITED STATES PATENT AND TRADEMARK OFFICE
CERTIFICATE OF CORRECTION

PATENT NO. : 10,934,639 B2
APPLICATION NO. : 16/143599
DATED : March 2, 2021
INVENTOR(S) : Hansjürgen Horter et al.

Page 1 of 1

It is certified that error appears in the above-identified patent and that said Letters Patent is hereby corrected as shown below:

In the Claims

Claim 1, Column 14, Line 52     "having comprising" should be --comprising--

Claim 5, Column 15, Line 28     "layers are present." should be --layers.--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*